United States Patent [19]

Fujii

[11] Patent Number: 5,384,768
[45] Date of Patent: Jan. 24, 1995

[54] TRACING SYSTEM FOR TRACING TRANSMISSION ROUTE IN TRANSMISSION NETWORK

[75] Inventor: Yasuo Fujii, Kawasaki, Japan

[73] Assignee: Fujitsu Limited, Kawasaki, Japan

[21] Appl. No.: 159,505

[22] Filed: Nov. 30, 1993

[30] Foreign Application Priority Data

Nov. 30, 1992 [JP] Japan .................................. 4-320594

[51] Int. Cl.⁶ .............................................. H04J 3/14
[52] U.S. Cl. .......................................... 370/14; 370/54;
340/825.06; 340/825.15; 340/825.18; 379/14;
379/15; 379/16; 379/34; 379/122; 379/136;
379/220; 379/221; 379/247
[58] Field of Search ....................... 370/13, 14, 16, 54;
379/1, 14, 220, 221, 15, 16, 34, 11, 222, 122,
136, 247; 340/825.06, 825.15, 825.16, 825.18

[56] References Cited

U.S. PATENT DOCUMENTS

| | | | |
|---|---|---|---|
| 4,464,543 | 8/1984 | Kline et al. | 379/16 |
| 4,513,411 | 4/1985 | Fraser | 370/13 |
| 4,756,019 | 7/1988 | Szybicki | 379/112 |
| 5,021,949 | 6/1991 | Morten et al. | 370/60 |
| 5,049,873 | 9/1991 | Robins et al. | 340/825.06 |
| 5,136,690 | 8/1992 | Becker et al. | 379/122 |

*Primary Examiner*—Douglas W. Olms
*Assistant Examiner*—Russell W. Blum

[57] ABSTRACT

A tracing system displays a transmission route between multiplexers in a transmission network. The system includes a MUX map database of the states in which multiplexers in each of stations are connected to each other, a route map database of attributes of transmission routes between stations, a station map database of transmission routes accommodated in each of the stations, a route map processing unit for tracing, using the route map database, a transmission route from a starting station to a terminating station, a MUX map processing unit for tracing, using the MUX map database, a connecting path in the terminating station of the transmission route traced by the route map processing unit, a station map processing unit for tracing a transmission route corresponding to a back-to-back connecting formation using the station map database, a changing unit for changing the information of the tracing start point based on a position of a multiplexer connected to an end of the transmission route corresponding to the back-to-back connecting formation, a tracing control unit for switching between the route map processing unit, the MUX map processing unit, the station map processing unit and the changing unit so that the transmission route is traced from the multiplexer at the tracing start point, to a multiplexer opposite to the multiplexer at the starting point, and a display unit for displaying the traced transmission route and connecting path.

3 Claims, 22 Drawing Sheets

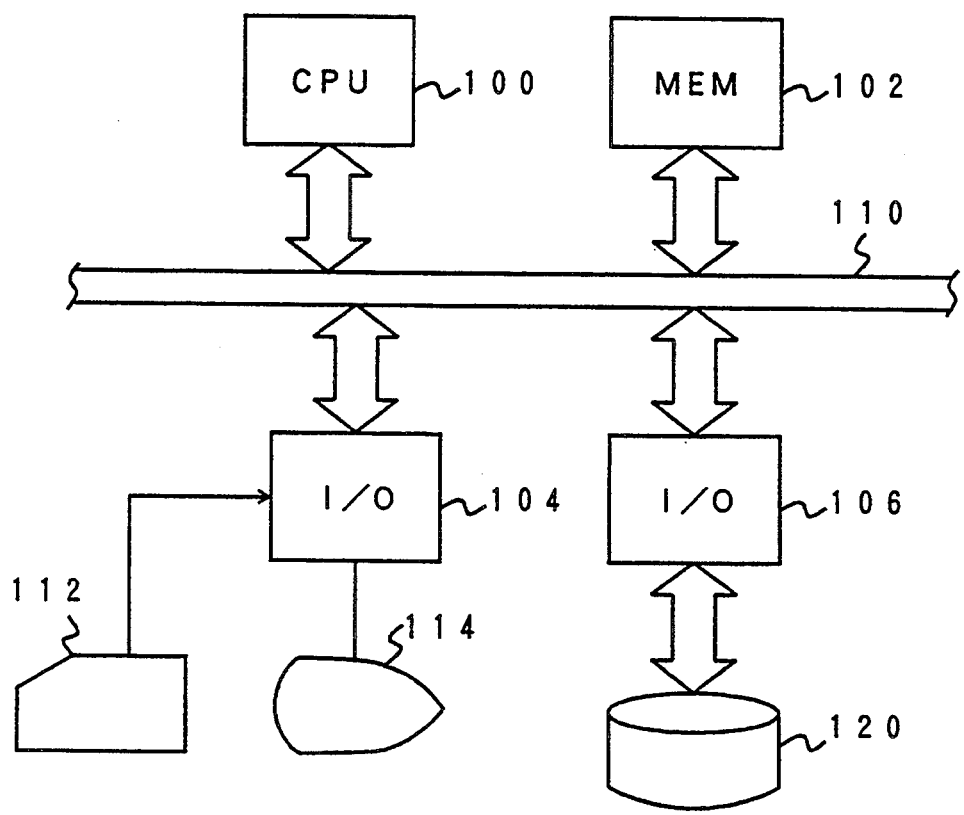

FIG. 9

| | |
|---|---|
| Route ID | 4 B |
| Station ID | 4 B |
| LINE NUMBER | 1 B |
| INTERSTATION EQUIPMENT NUMBER | 1 B |
| FREE (11Bytes) | 11 B |
| LINE ORDER | 1 B |
| NUMBER OF ELEMENTS | 2 B |

FIG. 10

(32byte)

| | |
|---|---|
| ELEMENT No. | (short) |
| ELEMENT ATTRIBUTE | (short) |
| PATTERN | |

FIG. 11

| ELEMENT ATTRIBUTE | PATTERN |
|---|---|
| 0 : UNSET | PATTERN 1 (ALL FREE) |
| 1 : CONNECTION OF ANSTHER SYS. | PATTERN 2 |
| 2 : EQUIPMENT | PATTERN 3 |
| 3 : CONNECTION OF SW.EQUIPMENT | PATTERN 3 |
| 4 : SPARE | PATTERN 1 (ALL FREE) |
| 5 : TEST | PATTERN 1 (ALL FREE) |
| 6 : UNDEFINED ROUTE | PATTERN 4 |

FIG. 12

| | | | |
|---|---|---|---|
| | | | TOTAL 28bytes |
| Route ID | | | (byte*4) |
| LINE NUMBER | | | (byte*1) |
| LINE SUPPLEMENTAL INF. | | | (byte*1) |
| EQUIPMENT ADDRESS | FOURTH-ORDER CONNECTING CH | | (byte*1) |
| | THIRD-ORDER CONNECTING CH | | (byte*1) |
| | SECOND-ORDER CONNECTING CH | | (byte*1) |
| | FREE | | (byte*1) |
| FREE | | | (char*2) |
| OPPOSITE STATION ID | | | (byte*4) |
| FREE | | | (char*12) |

FIG. 13

| | |
|---|---|
| TYPE CODE | (short) |
| SUPERVISING ADDRESS | (byte*8) |
| FREE | (char*18) |

FIG. 14

| | |
|---|---|
| COMMENT | (char*12) |
| FREE | (char*16) |

FIG. 15

| |
|---|
| ROUTE INF. (24B) |
| STATION (440B) |
| LINE (160B) |
| INTERSTATION EQUIPMENT (51,200B) |

FIG. 16

| ROUTE ID |
| --- |
| FREE (4B) |
| REDUNDANCY (1B) |
| NUMBER OF LINES (1B) |
| ROUTE TYPE (1B) |
| TRANSMISSION RATE (1B) |
| FREE (12B) |

FIG. 17

| START SW. TYPE (2B) |
| --- |
| START SW. SUPERVISING ADDRESS (8B) |
| START STATION ID (4B) |
| TERMINATION SW TYPE (2B) |
| TERMINATION SW. SUPERVISING ADDRESS (8B) |
| TERMINATION STATION ID (4B) |
| FREE (4B) |
| AREA ID |
| FREE (2B) |
| NUMBER OF STATIONS IN ROUTE (2B) |
| Station ID # 1 |
| RELAY EQUIPMENT HEAD POINTER # 1 |
| ... |
| # 5 0 |
| # 5 0 |

TRACING SYSTEM FOR TRACING TRANSMISSION ROUTE IN TRANSMISSION NETWORK

BACKGROUND OF THE INVENTION (1) Field of the Invention

The present invention relates to a tracing system for tracing and displaying a transmission route between multiplexers in a transmission network in which a plurality of stations are connected by lines, each station accommodating one or a plurality of multiplexers.

In recent years, to facilitate effective maintenance work in transmission networks, centralized supervisor systems for centrally supervising transmission devices remotely provided in the transmission network are required. In this type of the centralized supervisor system, a large number of transmission devices in remote stations are effectively centrally supervised and faults simultaneously occurring in transmission devices are indicated route by route, the indication being used to estimate the point at which the real fault has occurred in the transmission network.

A transmission path is used as transmission means for transmitting signals between switching devices, and various types of devices such as multiplexers and transmission devices are coupled to the transmission route in a complex manner. Thus, if a fault occurs at a single point, the fault may affect other devices coupled to the line in which the fault has occurred. The tracing of connections of a line is effective in estimation of a route through which the fault is extended.

The present invention is applicable to a centralized supervisor system for centrally supervising a large number of transmission devices and for displaying supervision results on a screen.

(2) Description of the Related Art

Conventionally, in this type of transmission route tracing system, a route map indicating each transmission route between stations, a station map indicating transmission paths in each station, and a multiplexer map (MUX map) indicating paths in which multiplexers accommodated in each station are connected, are alternatively displayable on a graphic display unit (GD). Looking at the screen on the graphic display unit (GD), an operator traces a transmission route from a multiplexer to another multiplexer opposite to it. The switching (transition) between maps to be displayed on the graphic display (GD) is carried out via a selecting operation of a maintenance worker except for the transition from the MUX map.

This selecting operation is carried out by designating lines to which attention is directed. However, in a case where there are multiplexers connected to each other in a "back-to-back" formation to provide a station with a relay function, a channel number identifying the traced line is changed on the way from the multiplexer to the other multiplexer opposite to it. Thus, in this case, it is difficult for the maintenance worker to trace the connections of the line on the respective maps.

SUMMARY OF THE INVENTION

Accordingly, a general object of the present invention is to provide a novel and useful tracing system for tracing a transmission route in a transmission network in which system the disadvantages of the aforementioned prior art are eliminated.

A more specific object of the present invention is to provide a tracing system for tracing a transmission route in a transmission network in which the tracing of a transmission route from a multiplexer to another multiplexer opposite to it can be easily carried out.

The above objects of the present invention are achieved by a tracing system for tracing and displaying a transmission route between multiplexers in a transmission network in which a plurality of stations are connected by lines, each station accommodating one or a plurality of multiplexers, the tracing system comprising: a first database provided with information indicating states in which multiplexers in each station in the transmission network are connected to each other; a second database provided with information indicating attributes of transmission routes between stations connected to each other by a line; a third database provided with information indicating transmission routes accommodated in each of the stations; input means for inputting information regarding a multiplexer positioned at a tracing start point; route map processing means for tracing, based on the information provided in the second database, a transmission route from a starting station to a terminating station; MUX map processing means for tracing, based on the information provided in the first data base, a connecting path in which multiplexers are connected in the terminating station of the transmission route traced by the route map processing means; station map processing means for tracing a transmission route corresponding to a back-to-back connecting formation based on the information provided in the third database when the connecting path traced by the MUX map recessing means includes the back-to-back connecting formation; changing means for changing the information indicating the starting point of the tracing based on a position of a multiplexer connected to an end of the transmission route which corresponds to the back-to-back connecting formation and is traced by the station map processing means; tracing control means for switching between the route map processing means, the MUX map processing means, the station map processing means and the changing means so that the transmission route is traced from the multiplexer at the starting point of the tracing identified by the information input by the input means to a multiplexer opposite to the multiplexer at the starting point; and display means for displaying the transmission route and the connecting path traced by the route map processing means, the MUX map processing means and the station map processing means all of which are switched by the tracing control means.

According to the present invention, a screen of the display means displaying the transmission route from a multiplexer indicated by the user to a multiplexer opposite to the indicated multiplexer can be switched in accordance with the switching of the route map processing means, the MUX map processing means and the station map processing means without requiring an operation for identifying a route to be displayed. Thus, even if a fault occurs in the transmission network, a point at which the fault occurs can be easily found out. That is, the tracing system having an improved HMI (Human-Machine Interface) can be provided.

Additional objects, features and advantages of the present invention will become apparent from the following detailed description when read in conjunction with the accompanying drawings.

BRIEF DESCRIPTION OF THE DRAWINGS

FIG. 7 is a block diagram illustrating an example of hardware of a transmission route tracing system according to the embodiment of the present invention.

FIG. 8 is a diagram illustrating a MUX map database.

FIG. 9 is a diagram illustrating an attribute definition portion in the MUX map database shown in FIG. 8.

FIG. 10 is a diagram illustrating the structure of each element-data item in the MUX map database shown in FIG. 8.

FIG. 11 is a diagram illustrating relationships between items of an element attribute in the element-data shown in FIG. 10 and patterns.

FIG. 12 is a diagram illustrating a structure of a pattern 2 set as the element-data.

FIG. 13 is a diagram illustrating a structure of a pattern 3 set as the element-data.

FIG. 14 is a diagram illustrating a structure of a pattern 4 set as the element-data.

FIG. 15 is a diagram illustrating a route map database.

FIG. 16 is a detailed diagram illustrating a route information portion in the route map database shown in FIG. 15.

FIG. 17 is a detailed diagram illustrating a station management portion in the route map database shown in FIG. 15.

DESCRIPTION OF THE PREFERRED EMBODIMENTS

Figure 1:
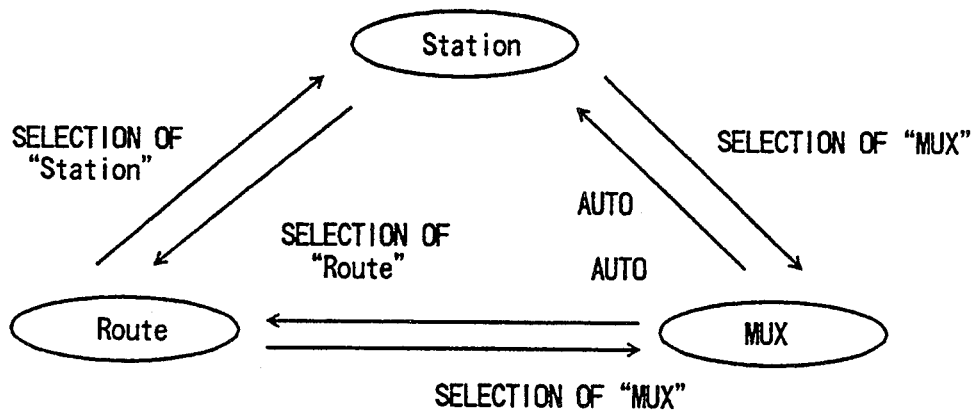
FIG. 1 is a diagram illustrating conventional transitions between maps to be displayed on a graphic display unit.
Figure 2:
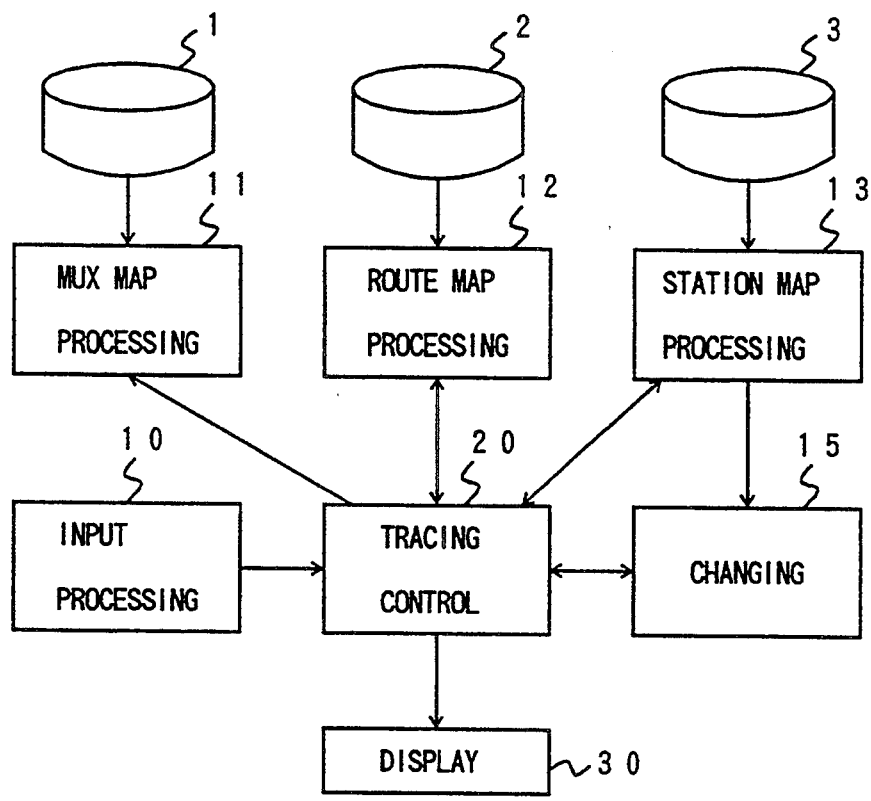
FIG. 2 is a block diagram illustrating the principle of a tracing system according to an example of the present invention.

A description will now be given, with reference to FIG. 2, of the principle of a tracing system according to an embodiment of the present invention.

A tracing system according to the present invention traces and displays a transmission route between multiplexers in a transmission network in which a plurality of stations are coupled to each other by lines, each station accommodating one or a plurality of multiplexers. Referring to FIG. 2, the tracing system has a first database 1, a second database 2, a third database 3, an input unit 10, a route map processing unit 12, a MUX map processing unit 11, a station map processing unit 13, a changing processing unit 15, a tracing control unit 20 and display unit 30. The first database 1 stores information indicating states in which multiplexers in respective stations on the transmission network are connected. The second database 2 stores information indicating attributes of transmission routes between stations connected by a line. The third database 3 stores information indicating transmission paths accommodated in the respective stations. Information about a multiplexer positioned at a tracing start point is input to the system by the input unit 10. The route map processing unit 12 traces, based on the information stored in the second database 2, a transmission route extending from a starting station to a terminating station. In the terminating station of the transmission route traced by the route map processing unit 12, the MUX map processing unit 11 traces, based on the information stored in the first database 1, a path in which multiplexers are connected. This path is referred to as a connecting path. In a case where the route traced by the MUX map processing unit 11 includes a back-to-back connecting formation, the station map processing unit 13 traces, based on the information stored in the third database 3, a transmission route corresponding to the back-to-back connecting formation. The changing processing unit 15 changes information indicating the tracing start point based on the position of a multiplexer connected to an end of the transmission route, corresponding to the back-to-back connecting formation, traced by the station map processing unit 13. The tracing control unit 20 carries out a switching operation for switching the route map processing unit 12, the MUX map processing unit 11, the station map processing unit 13 and the changing processing unit so that the transmission route is tranced from the multiplexer at the starting position identified by the information input by the input unit 10 to a multiplexer opposite to the multiplexer at the starting point. The display unit 30 switches, in accordance with the switching operation of the tracing control unit 20, screens on which the transmission paths traced by the route map processing unit 12 and the station map processing unit 13 and the connecting path traced by the MUX map processing unit 11 are displayed.

When information about a multiplexer at the tracing start point is input by the input unit 10, the tracing control unit 20 carries out the switching operation so that the route map processing unit 12 is selected. The selected route map processing unit 12 traces, based on the information stored in the second database 2, a transmission route extending from a starting station including the multiplexer at the tracing start point to a terminating station connected to the starting station by a line. At this time, the display unit 30 displays the transmission route extending from the starting station to the terminating station. After this, the tracing control unit 20 carries out the switching operation so that the MUX map processing unit 11 is selected. The selected MUX map processing unit 11 traces, based on the information stored in the first database 1, a connecting path of multiplexers in the terminating station displayed by the display unit 30. In a case where the MUX map processing unit 11 is selected, the display unit 30 switches the screen and displays the connecting path of the multiplexers in the terminating station. If a multiplexer opposite to the multiplexer identified by the information input by the input unit 10 exists in the terminating station, this tracing process is completed. According to the above tracing process, the transmission route extending from the multiplexer identified by the information input by the input unit 10 to another multiplexer opposite to the identified multiplexer is displayed by the display unit 30.

On the other hand, if the connecting path traced by the MUX map 11 includes the back-to-back connecting formation, the tracing control unit 20 carries out the switching operation so that the station map processing unit 13 is selected. The selected station map processing unit 13 traces, based on the information stored in the third database 3, a transmission route corresponding to the back-to-back connecting formation. When the station map processing unit 13 is selected, the display unit 30 switches the screen so as to display the transmission route corresponding to the back-to-back connecting formation. The tracing control unit 20 then carries out the switching operation so that the changing process unit 15 is selected. The changing process unit 15 changes the information identifying the tracing start point based on the position of the multiplexer connected to an end of the transmission route corresponding to the back-to-back connecting formation. After this, while the tracing control unit 20 is carrying out the switching operation so that the route map processing unit 12, the MUX map processing unit 11, the station map processing unit 13 or the changing process unit 15 is selected, the transmission route extending from the multiplexer at the tracing start point to another multiplexer opposite to the multiplexer at the staring point is traced by this system.

A description will now be given of an embodiment of the present invention.

In, for example, a transmission network of a CEPT type, analog signals, each of which has a rate of 64 kHz, or digital signals, each of which has a rate of 2 MHz, all of which signals are output from a switching device are multiplexed in a plurality of steps. The multiplexed signals having rates of 2 MHz, 8 MHz, 34 MHz and 140 MHz are transmitted over the transmission network by transmission devices. The signal having a rate of 2 MHz is referred to as a first-order signal, the signal having a rate of 8 MHz is referred to as a second-order signal, the signal having a rate of 34 MHz is referred to as a third-order signal and the signal having a rate of 140 MHz is referred to as a fourth-order signal. The transmission network can be provided with three types of multiplexers M12, M23 and M34. The first type of multiplexer M12 multiplexes four first-order signals and outputs one second-order signal. The second type of multiplexer M23 multiplexes four second-order signals and outputs one third-order signal. The third type of multiplexer M34 multiplexes four third-order signals and outputs one fourth-order signal. In each type of multiplexer, input signals correspond to channel CH1, CH2, CH3 and CH4 of the multiplexer.

Here, conception named a channel address x-y-z corresponding to a position of a terminal to which a multiplexer is to be connected is introduced. The channel address is represented by a set of numerals x, y and z. The numeral x identifies a third-order channel (D3), the numeral y identifies a second-order channel (D2), and the numeral z identifies a first-order channel (D1). If a channel to which a multiplexer is to be connected is not linked to the third-order channel, the second-order channel or the first-order channel, the numeral x, y or z of the channel address corresponding to the channel is equal to "0".

Figure 3:
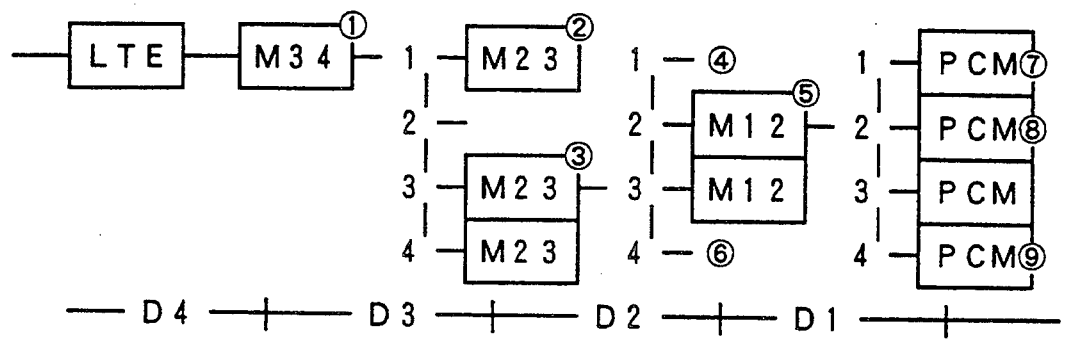
FIG. 3 is a diagram illustrating channel addresses in a station connected to a fourth-order line.

In a group of multiplexers connected to each other, as shown in FIG. 3, in a station connected to the line with the rate of 140 MHz (the fourth-order), positions (channels) 1, 2, 3, 4, 5, 6, 7, 8, and 9 are identified by the following channel addresses x-y-z.

|   | x-y-z |
|---|-------|
| 1 | 0-0-0 |
| 2 | 1-0-0 |
| 3 | 3-0-0 |
| 4 | 3-1-0 |
| 5 | 3-2-0 |
| 6 | 3-4-0 |
| 7 | 3-2-1 |
| 8 | 3-2-2 |
| 9 | 3-2-4 |

Figure 4:
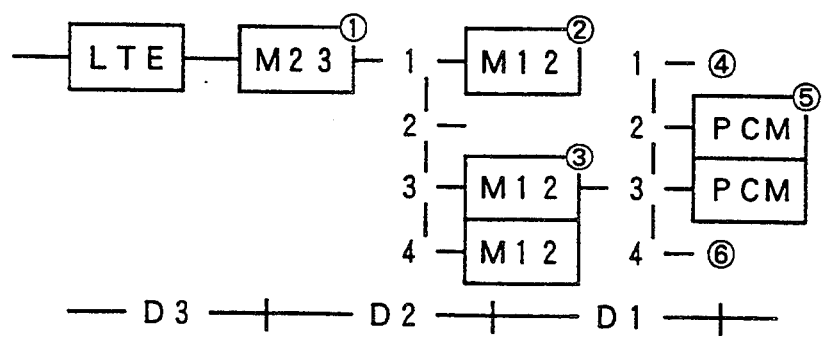
FIG. 4 is a diagram illustrating channel addresses in a station connected to a third-order line.

In a group of multiplexers connected to each other, as shown in FIG. 4, in a station connected to the line for the rate of 34 MHz (the third-order), positions (channels) 1, 2, 3, 4, 5 and 6 are identified by the following channel address.

|   | x-y-z |
|---|-------|
| 1 | 0-0-0 |
| 2 | 0-1-0 |
| 3 | 0-3-0 |
| 4 | 0-3-1 |
| 5 | 0-3-2 |
| 6 | 0-3-4 |

Figure 5:
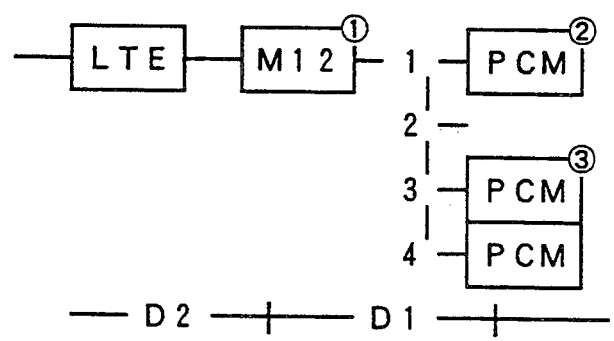
FIG. 5 is a diagram illustrating channel addresses in a station connected to a second-order line.

In a group of multiplexers connected to each other, as shown in FIG. 5, in a station connected to the line for the rate of 8 MHz (the second-order), positions (channels) 1, 2 and 3 are identified by the following channel address.

|   | x-y-z |
|---|-------|
| 1 | 0-0-0 |
| 2 | 0-0-1 |
| 3 | 0-0-3 |

Figure 6:
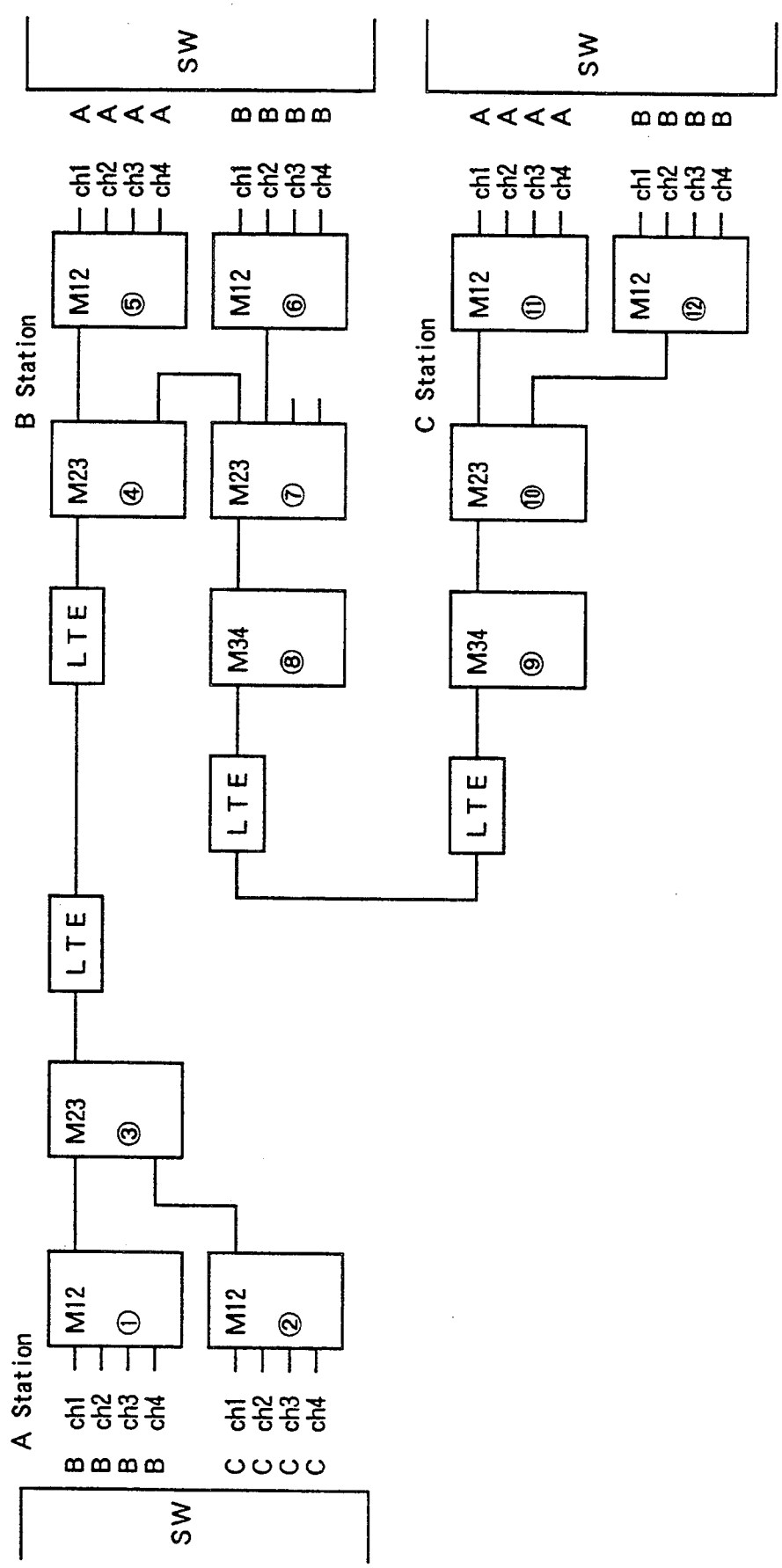
FIG. 6 is a block diagram illustrating an example of a transmission network of a CEPT type.

FIG. 6 indicates an example of a transmission network of the CEPT type. Referring to FIG. 6, this transmission network includes three stations A, B and C. The stations A and B are connected to each other by a third-order optical line (34 MHz), and the stations B and C are connected to each other by a fourth-order optical line (140 MHz). In the station A, a multiplexer M23 (3) is connected to the third-order optical line via light-to-electric converter LTE, and multiplexers M12 (1) and (2) are respectively connected to channels CH1 and CH2 of the multiplexer M23 (3). Channels CH1, CH2, CH3 and CH4 of each of the multiplexers M12 (1) and (2) are connected to a switching device (SW). In the station B, a multiplexer M23 (4) is connected to the third-order optical line via a light-to-electric converter LTE, a multiplexer M12 (5) is connected to a channel CH1 of the multiplexer M23 (4). A multiplexer M34 (8) is connected to the fourth-order optical line via a light-to-electric converter LTE, and a multiplexer M23 (7) is connected to a channel CH1 of the multiplexer M34 (8). A multiplexer M12 (6) is connected to a channel CH2 of the multiplexer M23 (7), and a channel CH2 of the multiplexer M23 (4) and a channel CH1 of the multiplexer M23 (7) are connected to each other in the back-to-back connecting formation. Channels CH1, CH2, CH3 and CH4 of each of the multiplexers M12 (5) and (6) are connected to a switching device (SW). In the station C, a multiplexer M34 (9) is connected to the fourth-order optical line via a light-to-electric converter LTE, and a multiplexer M23 (10) is connected to a channel CH1 of the multiplexer M34 (9). Multiplexers M12 (11) and (12) are respectively connected to channels CH1 and CH2 of the multiplexer M23 (10). Channels CH1, CH2, CH3 and CH4 of each of these multiplexers M12 (11) and (12) are connected to a switching device (SW).

Since the multiplexers M23 (4) and (7) in the station B are connected to each other in the back-to-back connecting formation, the communication between the stations A and C is carried out via the station B. In the back-to-back connecting formation, the channel CH2 is changed to the channel CH1. The multiplexers M12 (1), M12 (2) and M23 (3) in the station A are respectively opposite to the multiplexer M12 (5) in the station B, the multiplexer M12 (11) in the station C and the multiplexer M23 (4) in the station B. Further, the multiplexers M12 (6), M23 (7) and M34 (8) in the station B are respectively opposite to the multiplexers M12 (12), M23 (10) and M34 (9). Thus, for example, the channel CH1 of the multiplexer M12 (1) in the station A is coupled to the channel CH1 of the multiplexer M12 (5) opposite to it in the station B, and for example, the channel CH1 of the multiplexer M12 (2) in the station A is coupled via the station B to the channel CH1 of the multiplexer M12 (11) opposite to it in the station C.

FIG. 7 shows an essential structure of a computer hardware containing a tracing system for tracing a transmission route in the transmission network as shown in FIG. 6. Referring to FIG. 7, a CPU (Central Processing Unit) 100 and a memory unit 102 (a ROM, a RAM and the like) are connected to a bus 110 (including an address bus, a data bus and a control bus), and a keyboard 112 and a display unit 114 are connected to the bus 110 via an interface 104. Furthermore, an external storage unit 120 is connected to the bus 110 via an interface 106. Various databases representing the structure of the transmission network as shown in FIG. 6 are stored in the external storage unit 120. The databases will be described later. The CPU 100 traces a transmission route starting from a multiplexer identified by information input from the keyboard 112 using the databases stored in the external storage unit 120. The transmission route traced by the CPU 100 is displayed by the display unit 114.

The external storage unit 120 has previously stored three kinds of database: a MUX (multiplexer) map database, a route map database and a station map database.

The MUX map database is provided with information indicating connecting states of multiplexers in each of the stations, and has the structure as shown in FIGS. 8–11. FIG. 8 shows the overall structure of the MUX map database. That is, the MUX map database is formed of an attribute definition portion (24 Bytes) and element-data items 1 to n (each having 32 Bytes). Each of the element-data items corresponds to a channel address described above, and the element-data items are arranged in sequence of decreasing order starting from the maximum order (the sequence being the fourth-order, the third-order, the second-order and the first-order). If element-data items have the same order, the element-data items are arranged in sequence of increasing channel number starting from the minimum channel number (the sequence being channels CH1, CH2, CH3 and CH4). The number (n) of the element-data items in the MUX map database is equal to the number of transmission devices which can be accommodated in the station and depends on the order of the line connected to the station. That is, the number of element-data items for the stations connected to the first-order, second-order, third-order and fourth-order lines are as follows.

first-order: 1
second-order: 5
third-order: 21
fourth-order: 85

For example, a station connected to the third-order line can be provided with one multiplexer M23, four multiplexers M12 connected to the multiplexer M23, and sixteen PCM converters connected to the four multiplexers M12. The total number "21" of the devices in the station is the number of element-data items in the MUX map database.

The attribute definition portion, as shown in FIG. 9, has a "Route ID" for identifying a transmission route in which the station exists, a "Station ID" for identifying the station, a "LINE NUMBER" an "ELEMENT NUMBER OF INTERSTATION EQUIPMENT", a "LINE ORDER" for identifying an order of a line to which the station is connected, and a "NUMBER OF ELEMENTS" for identifying the number of devices in the station. Each of the element-data items is formed, as shown in FIG. 10, of an "ELEMENT NUMBER" used as a management number for each element, an "ELEMENT ATTRIBUTE" indicating the type of connecting state at the channel address corresponding to each element and pattern data indicating the connecting state corresponding to the "ELEMENT ATTRIBUTE". The "ELEMENT ATTRIBUTE" includes the following seven items.

0: UNSET
1: BACK-TO-BACK CONNECTING FORMATION
2: STATE IN WHICH EQUIPMENT IS CONNECTED
3: STATE IN WHICH SWITCHING EQUIPMENT IS CONNECTED
4: STATE IN WHICH SPARE UNIT IS CONNECTED (SPARE )
5: STATE IN WHICH TESTING UNIT IS CONNECTED (TEST)

6: UNDEFINED ROUTE

With respect to the above seven items 0 to 6 in the "ELEMENT ATTRIBUTE" pattern data items 1 to 4 are assigned as shown in FIG. 11. A pattern 1 is empty, and patterns 2 to 4 are respectively formed as shown in FIGS. 12-14. The item "1" of the "ELEMENT ATTRIBUTE" indicating a back-to-back connecting formation corresponds to the pattern 2. The pattern 2 includes information concerning path and devices (multiplexers) to be connected in the back-to-back connecting formation, a station opposite to the station and so on. The item "2" of the "ELEMENT ATTRIBUTE" indicating a state in which an device is connected to the element (the device) corresponds to the pattern 3 shown in FIG. 13. The pattern 3 includes a type code of the connected device and a supervisory address. The item "6" of the "ELEMENT ATTRIBUTE" indicating an undefined route corresponds to the pattern 4 shown in FIG. 14. The pattern 4 includes information regarding the undefined route.

Figures 18, 19, 20:
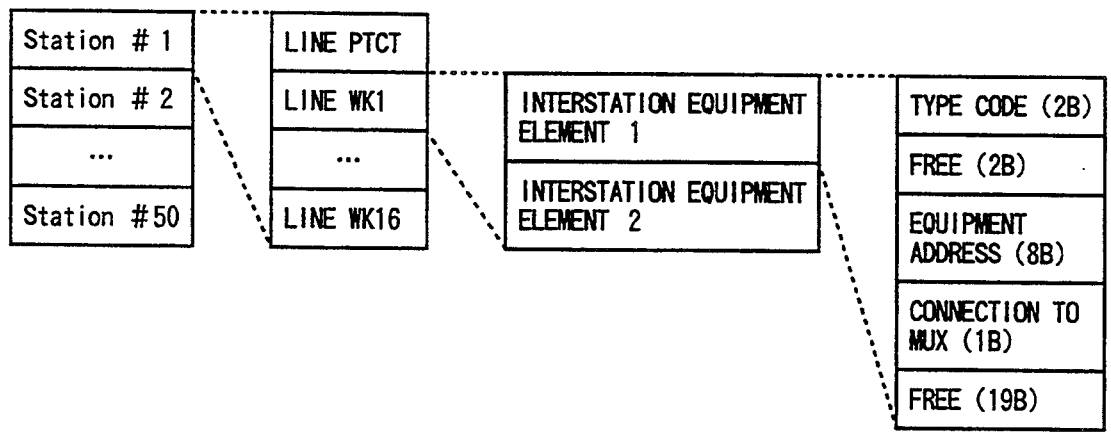
FIG. 18 is a detailed diagram illustrating a structured line portion in the route map database shown in FIG. 15.
FIG. 19 is a detailed diagram illustrating an interstation equipment portion in the route map database shown in FIG. 15.
FIG. 20 is a diagram illustrating a station map database.

The route map database is provided with information indicating attributes of transmission routes between stations, and has the structure as shown in FIGS. 15-19. FIG. 15 shows the overall structure of the route map database. The route map database has a route information portion (24 Bytes), a station portion (440 Bytes), a line portion (160 Bytes) and an interstation equipment portion (51,200 Bytes). The route information portion includes information identifying a transmission route and is formed as shown in FIG. 16. The station portion includes information concerning a starting station and a terminating station both of which are connected to a transmission route, and is formed as shown in FIG. 17. The line portion includes information regarding lines in the transmission route, and is formed as shown in FIG. 18. The interstation equipment portion includes information concerning a device connected to a line in the transmission route between the stations, and is formed as shown in FIG. 19.

The station map database is provided with information indicating transmission paths accommodated in each of the stations, and is formed as shown in FIG. 20. That is, the station map database is formed of the number of transmission routes in the station and a "Route IC" identifying each of the transmission routes.

The CPU 100 carries out a tracing process in accordance with flow charts shown in FIGS. 21-25. A description will now be given of the tracing process in a case where a transmission route from the multiplexer M12 (2) in the station A to the multiplexer M12 (11), opposite to the multiplexer M12 (2), in the station C is traced in the transmission network of the CEPT type.

Figure 21:
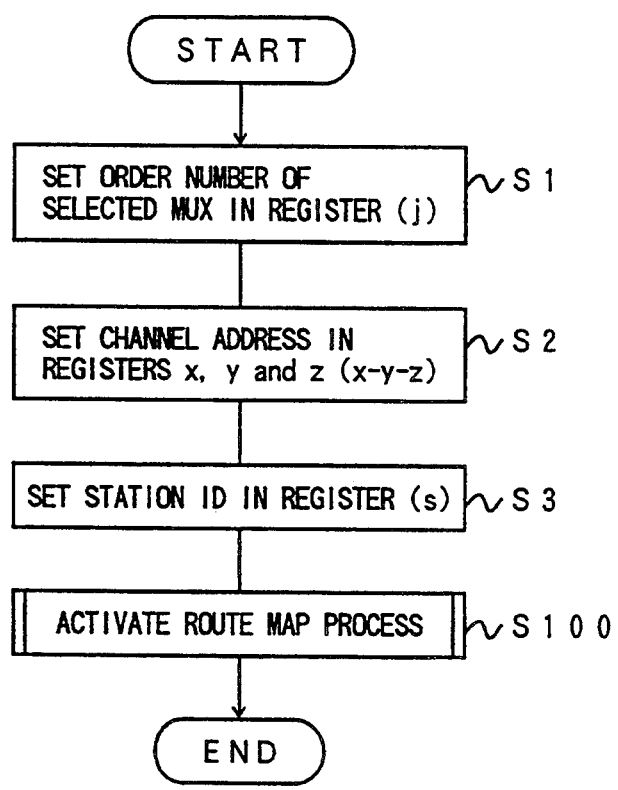
FIG. 21 is a flow chart illustrating an initial process in a tracing process.
Figure 26:
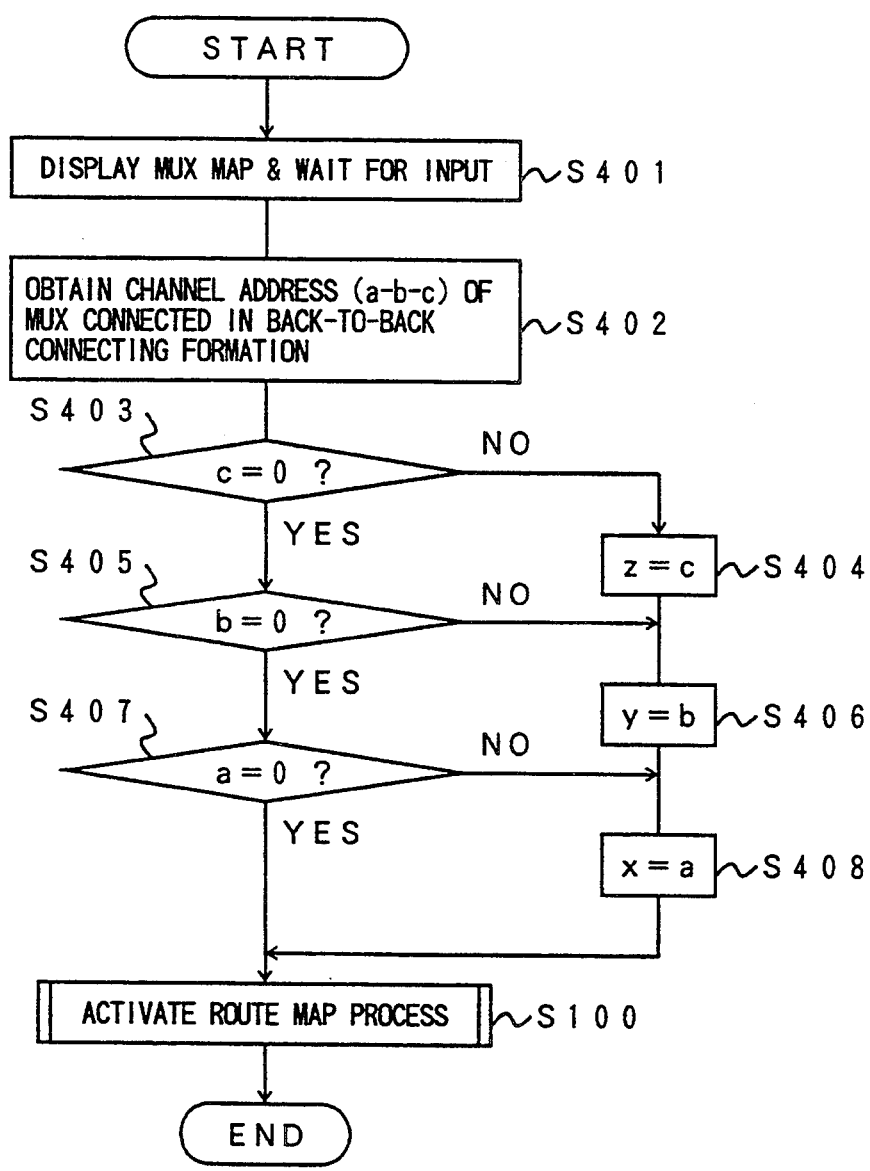
FIG. 26 is a flow chart illustrating a back-to-back process.

When an operator inputs from the keyboard 112 information identifying the multiplexer M12 (2) in the station A and initiates the tracing process, an initial process shown in FIG. 21 is performed. Referring to FIG. 21, the order number "2" of the selected multiplexer M12 (2) is set in a register (j) (step S1), and the channel address (x-y-z=0-2-0) of the selected multiplexer M12 (2) is set in registers x, y and z (step S2). A station identifying number ("Station ID") identifying the station A provided with the selected multiplexer M12 (2) is then set in a register S (step S3). When the multiplexer M12 (2)) is selected, the connecting formation of multiplexers (the MUX map) in the station A is displayed by the display unit 114 as shown in FIG. 26. After the process in step 3 is completed, a route map process S100 is activated.

Figure 22:
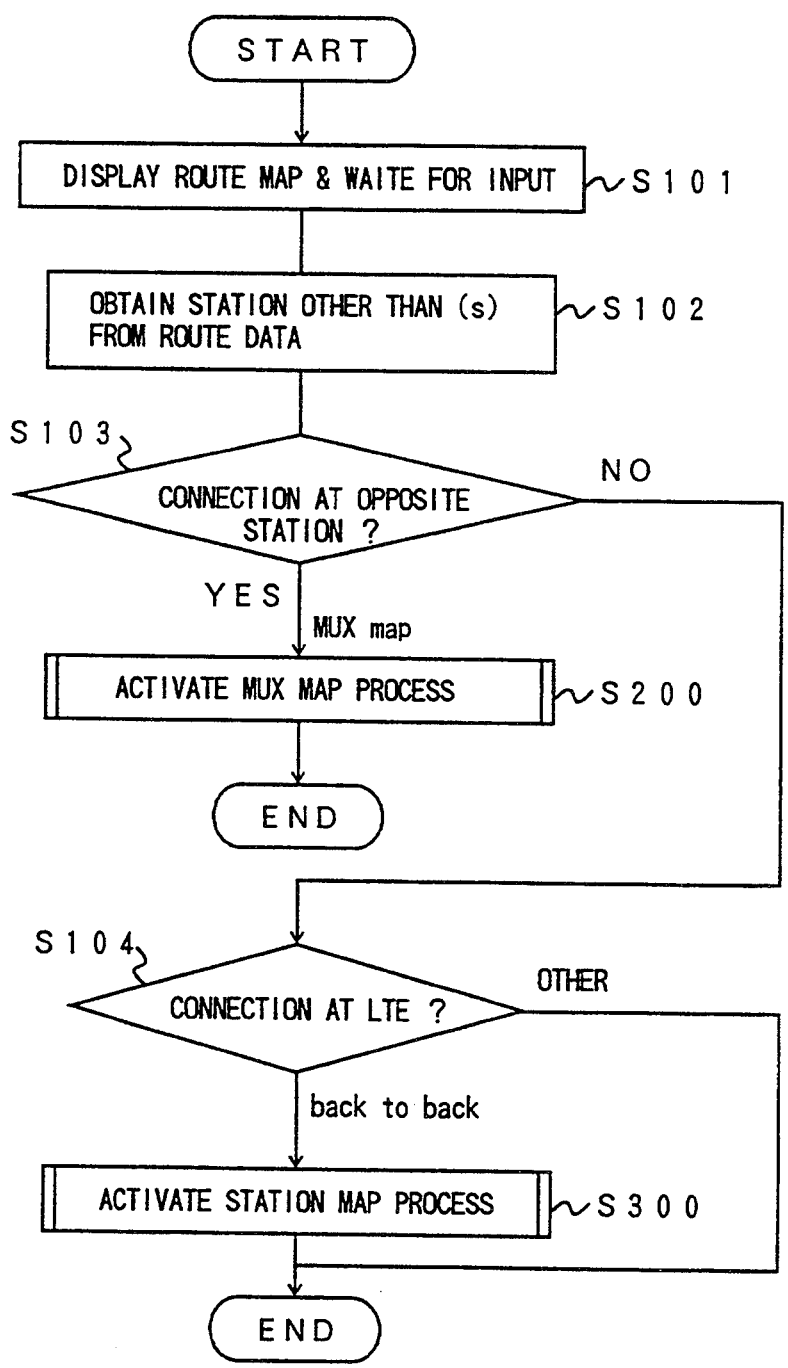
FIG. 22 is a flow chart illustrating a route map process.
Figure 27:
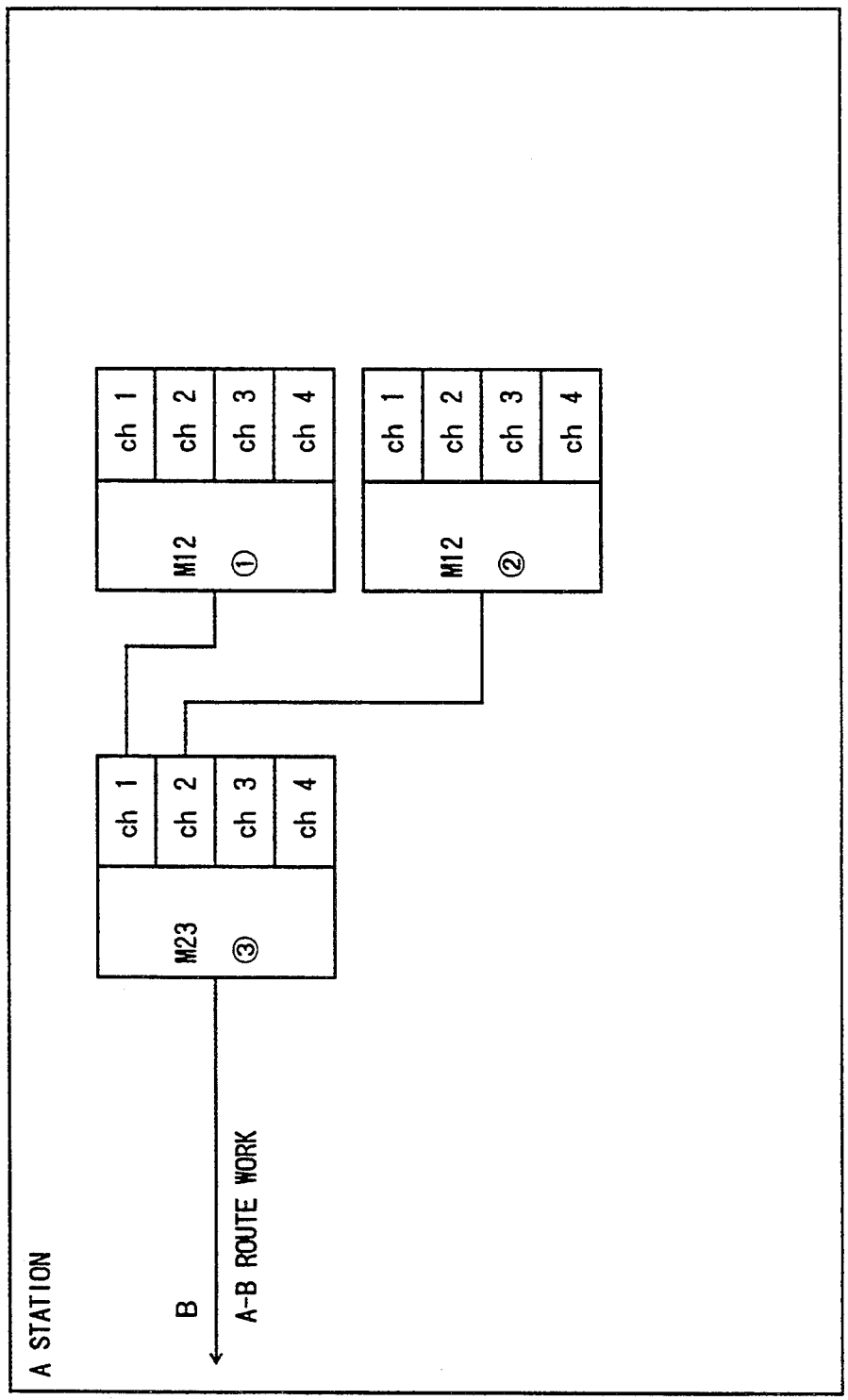
FIG. 27 is a diagram illustrating an initial screen in the tracing process.
Figure 28:
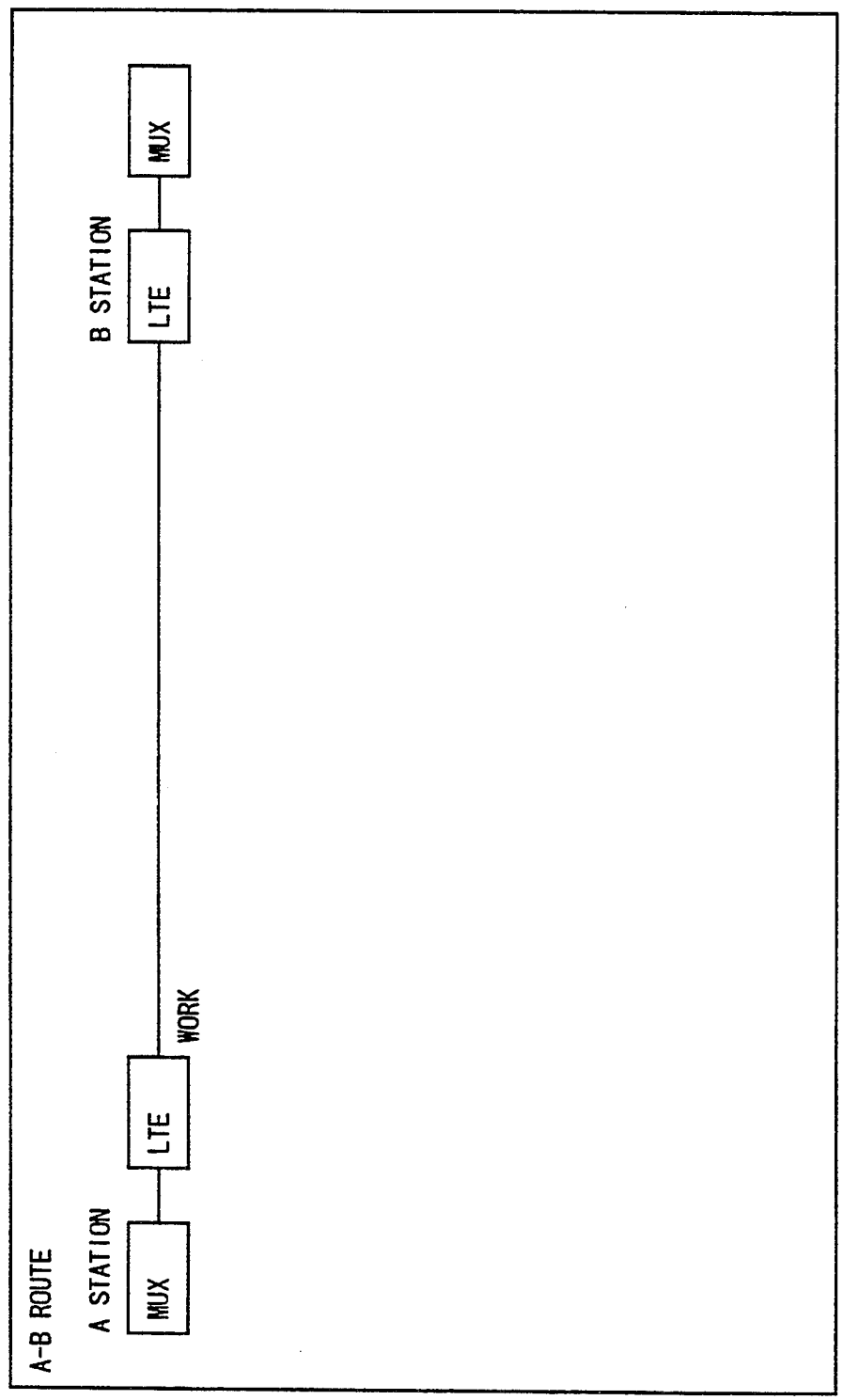
FIG. 28 is a diagram illustrating the route map from a station A to another station B.

When the route map process S100 is activated, the process shown in FIG. 22 starts, and the screen on the display unit 114 is switched to a route map as shown in FIG. 27 (step S101). The route map indicates a transmission route from the station provided with the selected multiplexer M12 (2) to the station B connected to the station A. After this, the CPU 100 recognizes, based on the route map database (see FIGS. 15-19), the station A set in the register S and the station B which is opposite to the station A and is the terminating station of the transmission route (step S102). It is determined, based on the MUX database, whether or not a multiplexer is provided in the station B (step S103). In this embodiment, the multiplexer is provided in the station B. Thus, after the process in step S103 is completed, the MUX map process S200 for the station B is activated.

Figure 23:
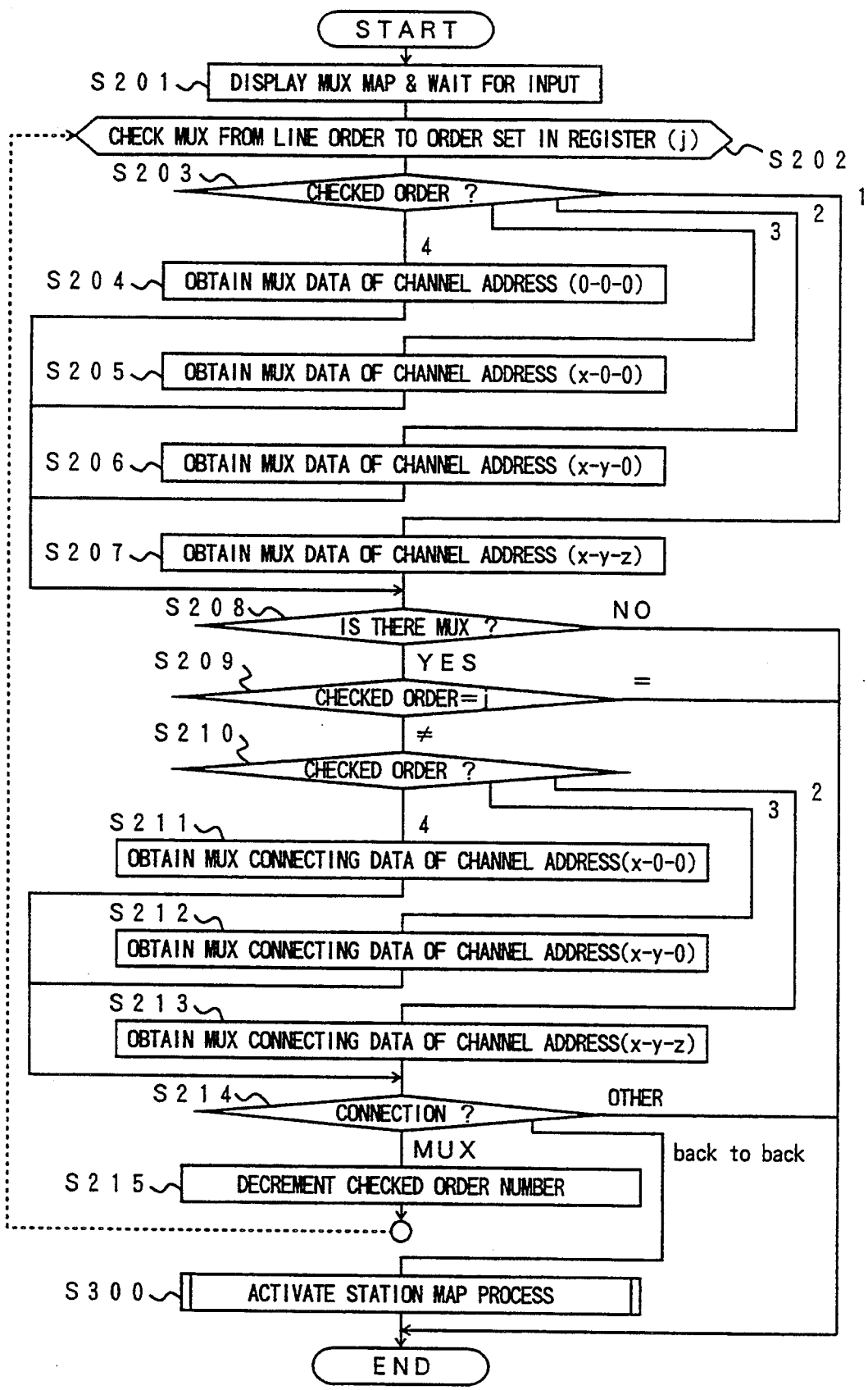
FIG. 23 is a flow chart illustrating a MUX map process.
Figure 29:
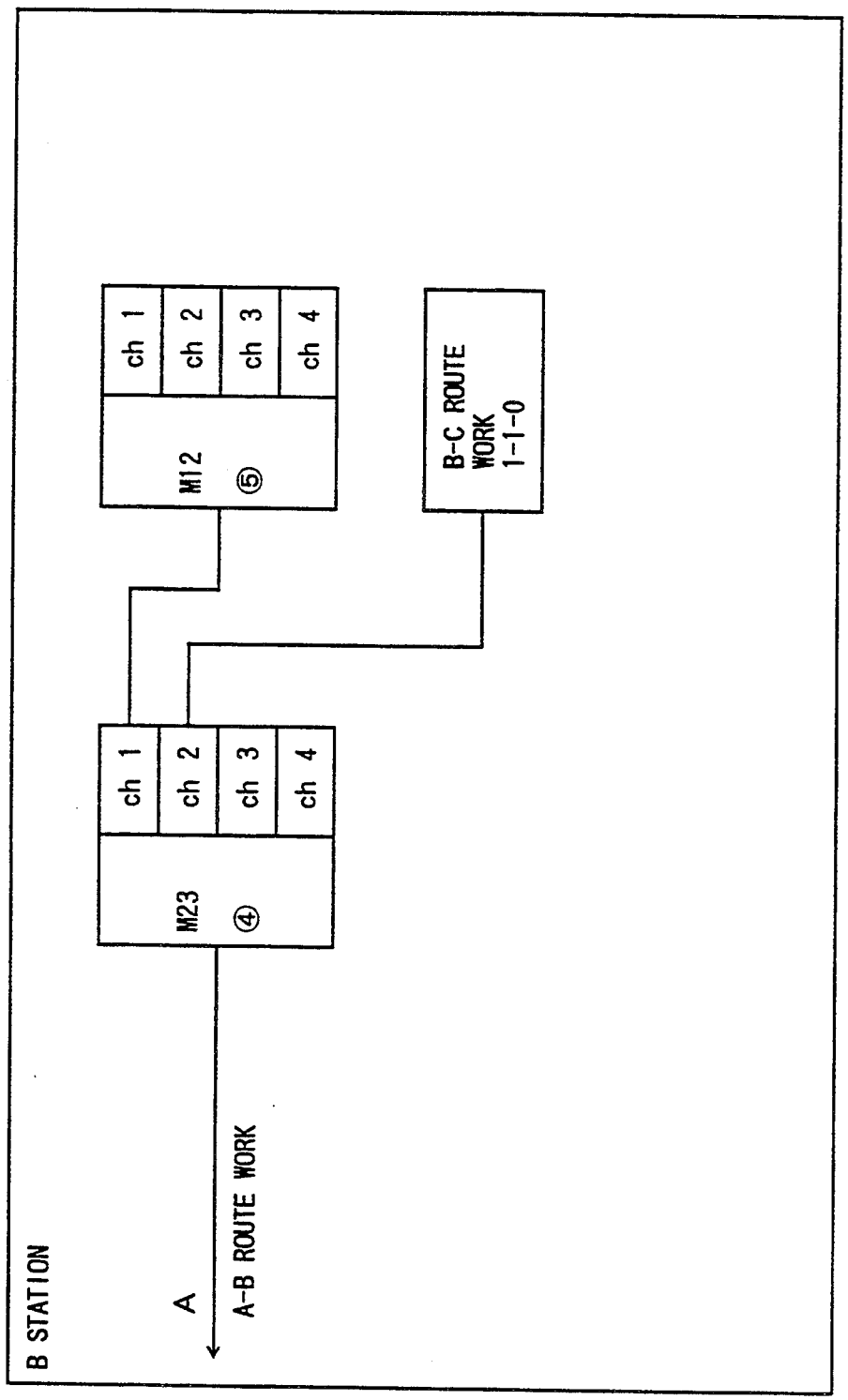
FIG. 29 is a diagram illustrating the MUX map in the station B.

When the MUX map process S200 is activated, the process shown in FIG. 23 starts, and the display on the display unit 114 is switched to a MUX map as shown in FIG. 29 (step S201). The MUX map indicates, in the station B, a path reaching the same channel address 0-2-0 as the selected multiplexer M12 (2) in the station A. After this, a process of checking connecting states of multiplexers in the path (the connecting path) indicated by the MUX map from the line order number to the order number set in the register (j) (step S202) is executed. In this embodiment, the stations A and B are connected by the third-order optical line (the line order number is "3") and the order number "2" is set in the register (j). Thus, the connecting state of the multiplexers starting from the third-order (the order number "3") to the second-order (order number "2") are checked. That is, the CPU 100 starts, with reference to the MUX database, the checking of the connecting state of the multiplexers from the third-order and recognizes a multiplexer corresponding to a channel address 0-0-0 (step S205). In this case, since the station B has the multiplexer M23 (4) corresponding to the channel address 0-0-0, the CPU 100 determines, after step S208, whether or not the order number for which the connecting state is to be checked has reached the order number "2" set in the register (j) (step S209). Since the connecting state in the third-order (the order number "3") is currently being checked, connecting data at the channel address ((x=0)—(y=2)—0) is obtained from the MUX map database (see FIGS. 8-14) (steps 210 and 212). In the station B, the channel address 0-2-0 corresponds to the channel CH2 of the multiplexer M23 (4). The element-data item, in the MUX map database, corresponding to the channel CH2 of the multiplexer M23 (4) indicates the back-to-back connecting formation, and, after step 214, a station map process 300 is activated.

In the above MUX map process, when the CPU 100 determines, in step 208, that the station B does not have a multiplexer, the tracing process is completed since the connecting path extends no further. In addition, when the checking of the connecting state of the multiplexer for the order number set in the register (j) is completed (step S209), the tracing process is completed since the connecting path reaches the multiplexer at the terminating point opposite to the multiplexer at the starting point. When the CPU 100 determines, in step S214, that there is a multiplexer, the CPU 100 decrements the order number (step S215), in which the connection state of the multiplexer is to be checked, by one and the MUX map process is repeated since the connecting path does not reach the multiplexer opposite to the multiplexer at the starting point. Furthermore, when it is determined, in step S214, that there is another device, the tracing process is completed since the transmission route is terminated at the other device.

Figure 24:
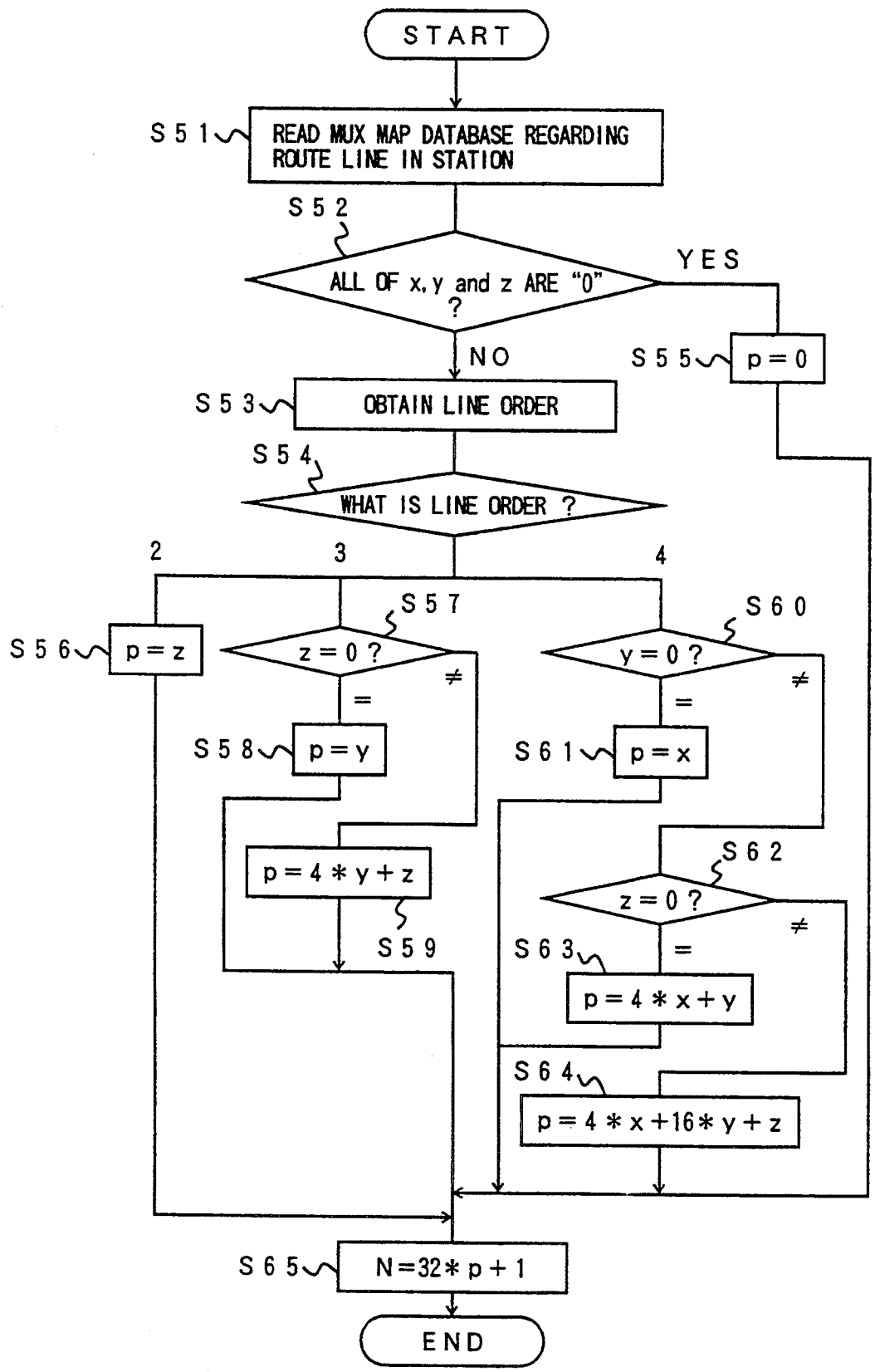
FIG. 24 is a flow chart illustrating a process for obtaining connection data from a channel address.

In the above MUX map process, a process (each of steps S211, S212 and S213) for obtaining the connecting data corresponding to the channel address x-y-z is performed in accordance with a flow chart shown in FIG. 24.

Referring to FIG. 24, the CPU 100 reads out from the external storage unit 120 the MUX map for the connecting path in the identified station (e.g. the station B) (step S51). After this, the CPU 100 determines whether or not all the components x, y and z of the channel address x-y-z are equal to "0" (step S52). If the channel address is equal to 0-0-0, a coefficient P is set to "0" (step S55), and a position N at which the element data is stored in the MUX map database (FIG. 8) is calculated in accordance with the following equation:

$$N = 32 \cdot P + 1.$$

In a case where the coefficient P is equal to "0", the position N is equal to "1" (N=1), so that the element data of the first byte in the MUX map database is selected as the data corresponding to the channel address 0-0-0. In a case where the channel address is equal to 0-2-0 as described above, the process proceeds from step 52 to step 54. In this case, since the station B is connected to the third-order line, the coefficient P is set to "y=2" (steps 57 and 58). As a result, in step S65, the calculation result N=65 is obtained. That is, the element data of the 65-th byte corresponds to the channel address 0-2-0. The element data of the 65-th byte is the "element-data item 3" in FIG. 8. In the MUX map database relating to the station B connected to the third-order line, the element-data items 1, 2, 3 and 4 respectively correspond to the channel addresses 0-0-0, 0-1-0, 0-2-0 and 0-3-0.

In a general case, the process in steps 51-65 shown in FIG. 24 is executed, the position N at which the element-data item is stored in the MUX map database is calculated based on the channel address x-y-z.

As has been described above, in this embodiment, it is determined that the channel CH2 of the multiplexer M23 (4) is in the back-to-back connecting formation. As a result, a station map process 300 is activated.

Figure 25:
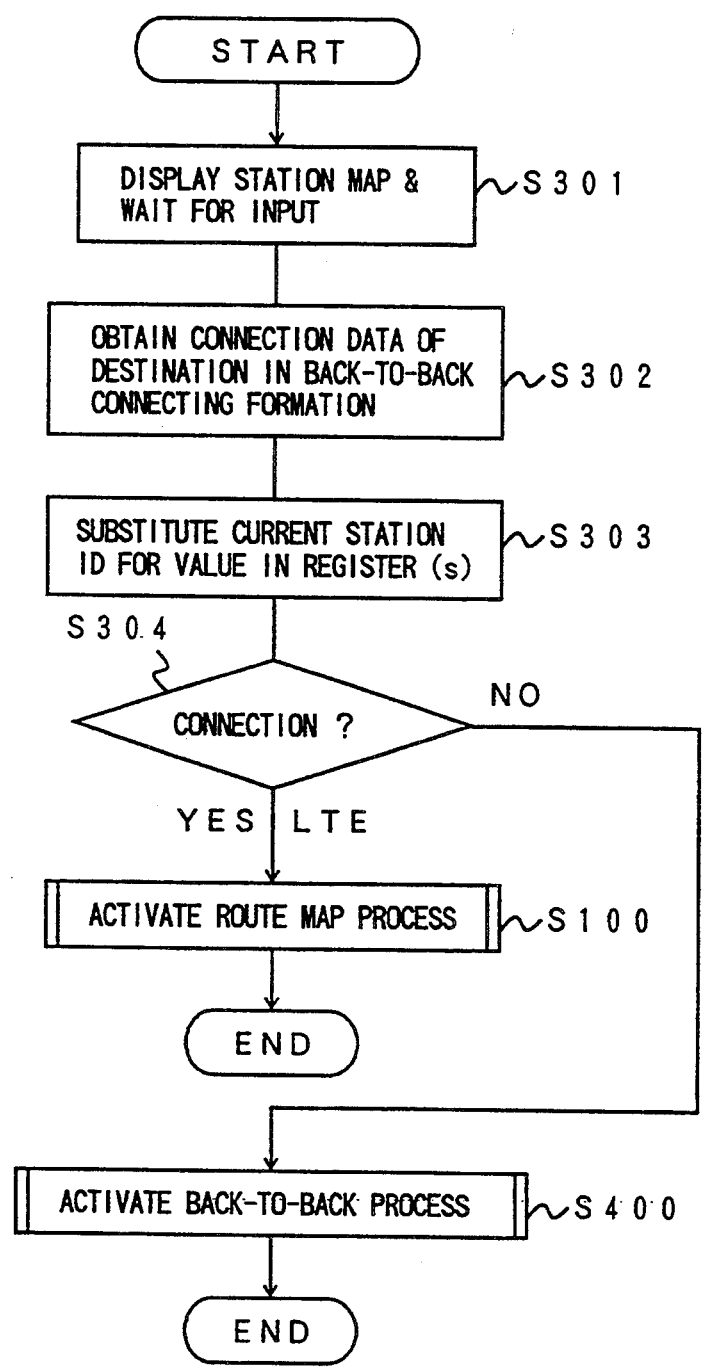
FIG. 25 is a flow chart illustrating a station map process.
Figure 30:
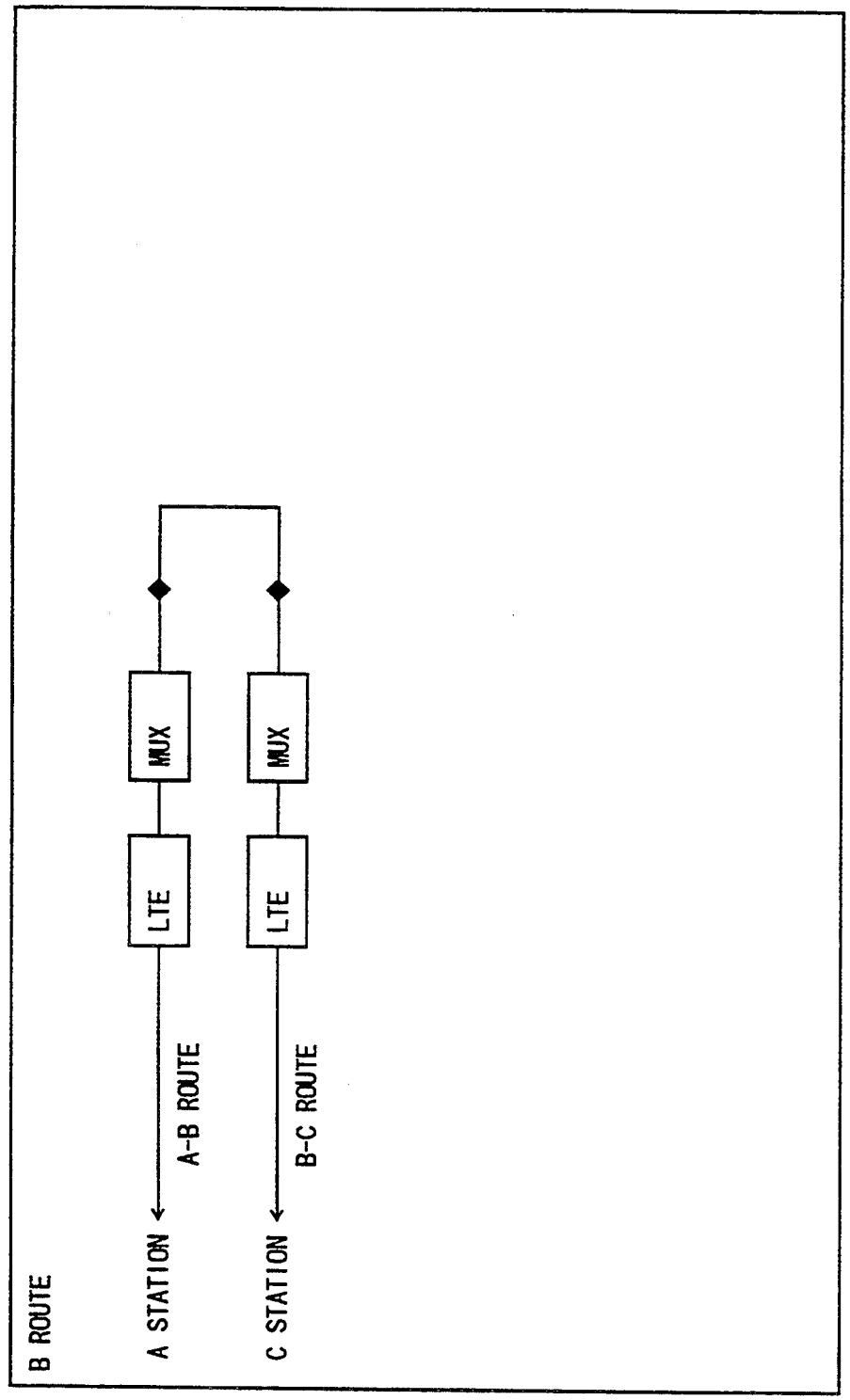
FIG. 30 is a diagram illustrating the station map in the station B.

When the station map process 300 is activated, a process shown in FIG. 25 starts, and the display of the display unit 114 is switched to a station map as shown in FIG. 30 (step S301). This station map indicates a transmission route corresponding to the back-to-back connecting formation in the station B. In FIG. 30, a route between symbols ◆ is the transmission route corresponding to the back-to-back connecting formation. This route is identified using data in the station map database (FIG. 20). After this, the CPU 100 obtains connecting data for the termination of the identified route, and rewrites the "Station ID" in the register (S) to a value identifying the station B in which the back-to-back connecting formation exists (step S303). It is determined, based on the connecting data, whether or not the termination of the identified route is connected to the light-to-electric converter LTE (step S304). If the light-to-electric converter LTE is connected to the termination of the identified route, the route map process S100 described above is activated, and the tracing process for tracing a route to another station is executed. On the other hand, if the termination of the identified route is connected to a device such as a multiplexer, a back-to-back process S400 is activated.

Figure 31:
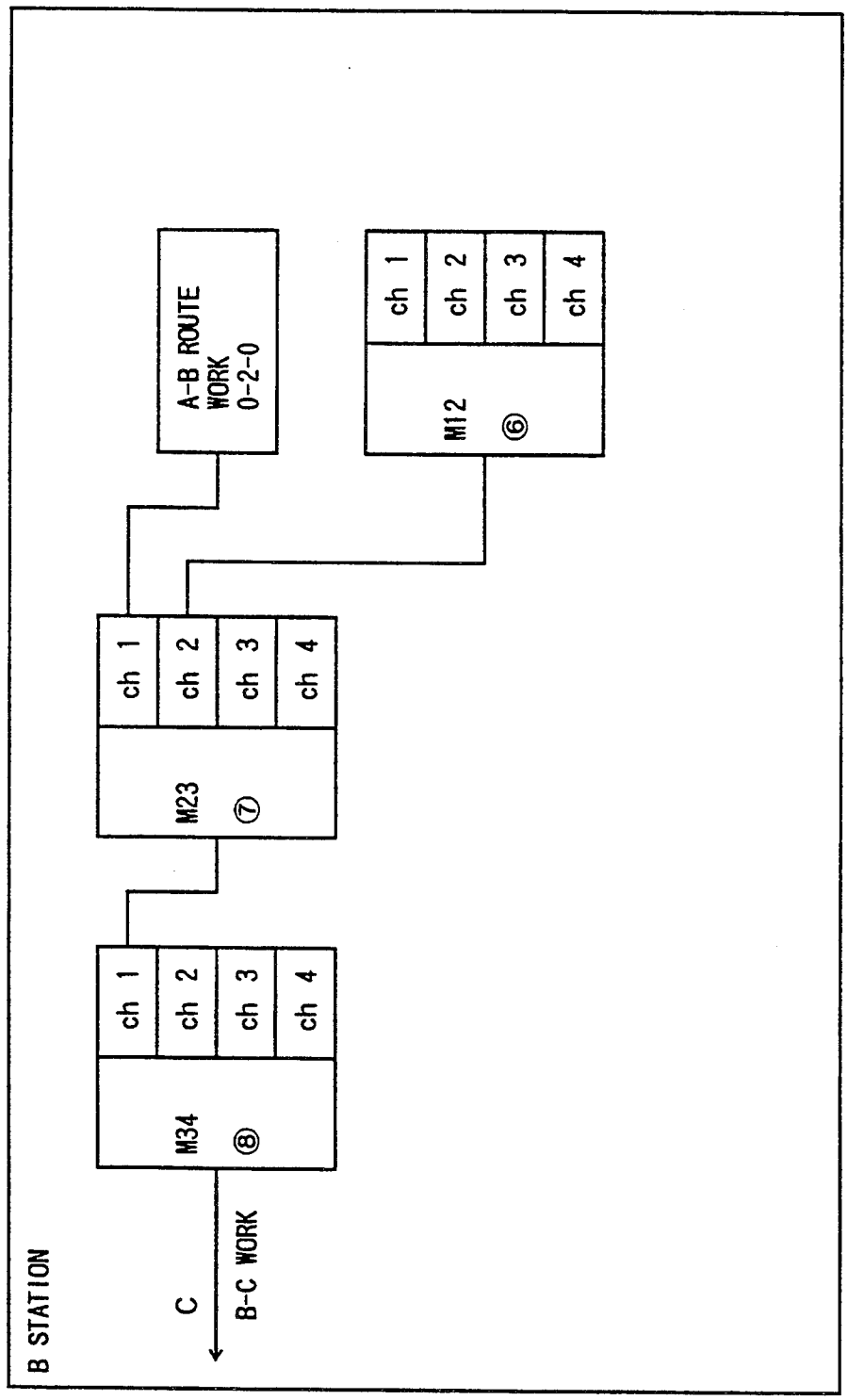
FIG. 31 is a diagram illustrating the MUX map in the station B.

When the back-to-back process S400 is activated, a process shown in FIG. 26 starts, and the display on the display unit 114 is switched to a MUX map as shown in FIG. 31 (step S401). This MUX map indicates multiplexers in a path extending from the multiplexer connected to the termination of the route corresponding to the back-to-back connecting formation. After this, the CPU 100 obtains, with reference to the MUX map database, the channel address a-b-c of the multiplexer connected to the transmission path corresponding to the back-to-back connecting formation (S402). In this embodiment, the channel CH1 of the multiplexer M23 (7) is connected to the termination of the transmission path corresponding to the back-to-back connecting formation, so that the channel address 1-1-0 is obtained. Due to the process from steps S403 to step S408, the channel address 0-2-0 in the registers x, y and z is rewritten to the channel address 1-1-0 (a-b-c). That is, the channel address, in the registers x, y and c, indicating the start point of the tracing is rewritten to the channels address 1-1-0. The route map process S100 is then activated.

Figure 32:
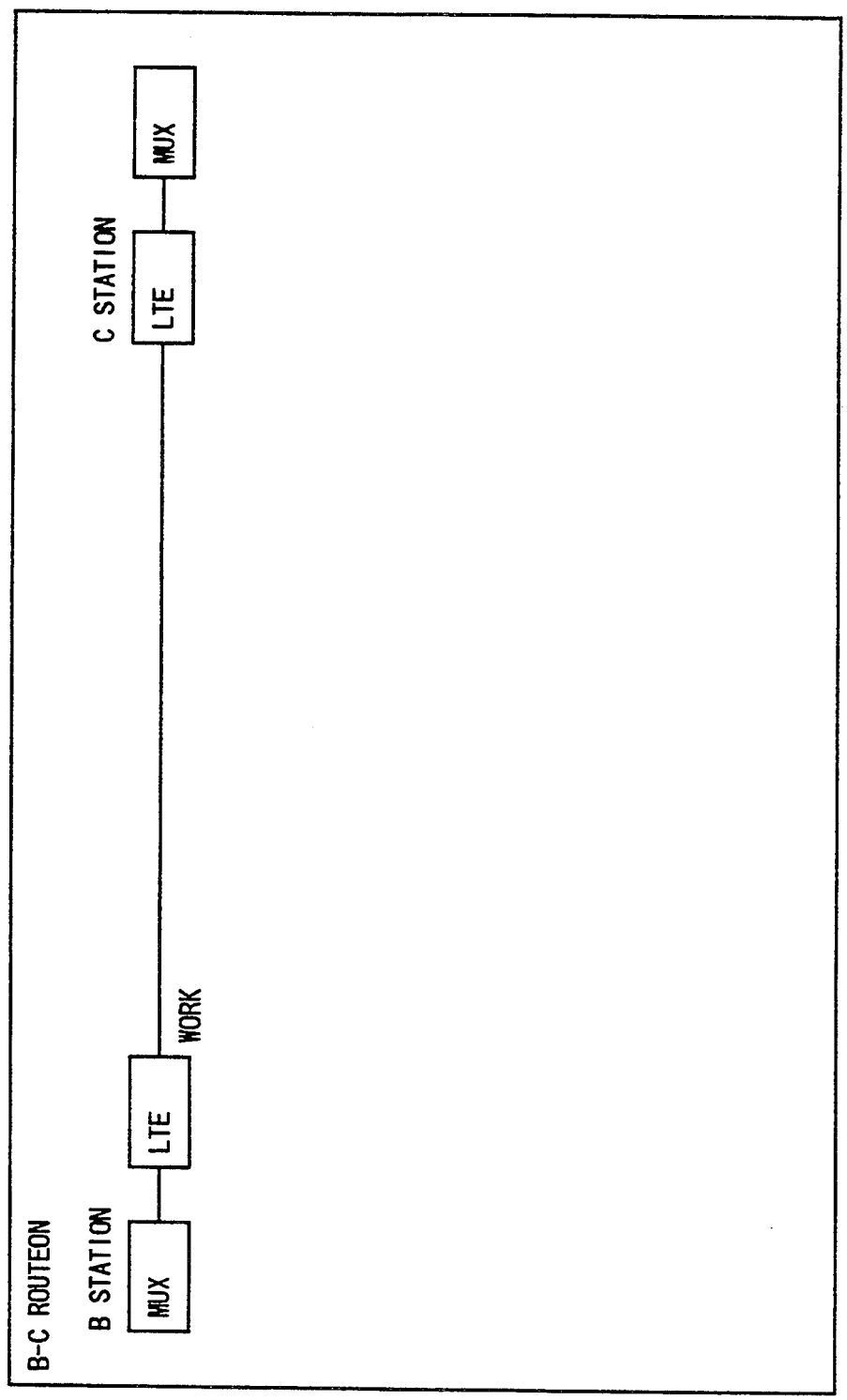
FIG. 32 is a diagram illustrating the route map from the station B to another station C.
Figure 33:
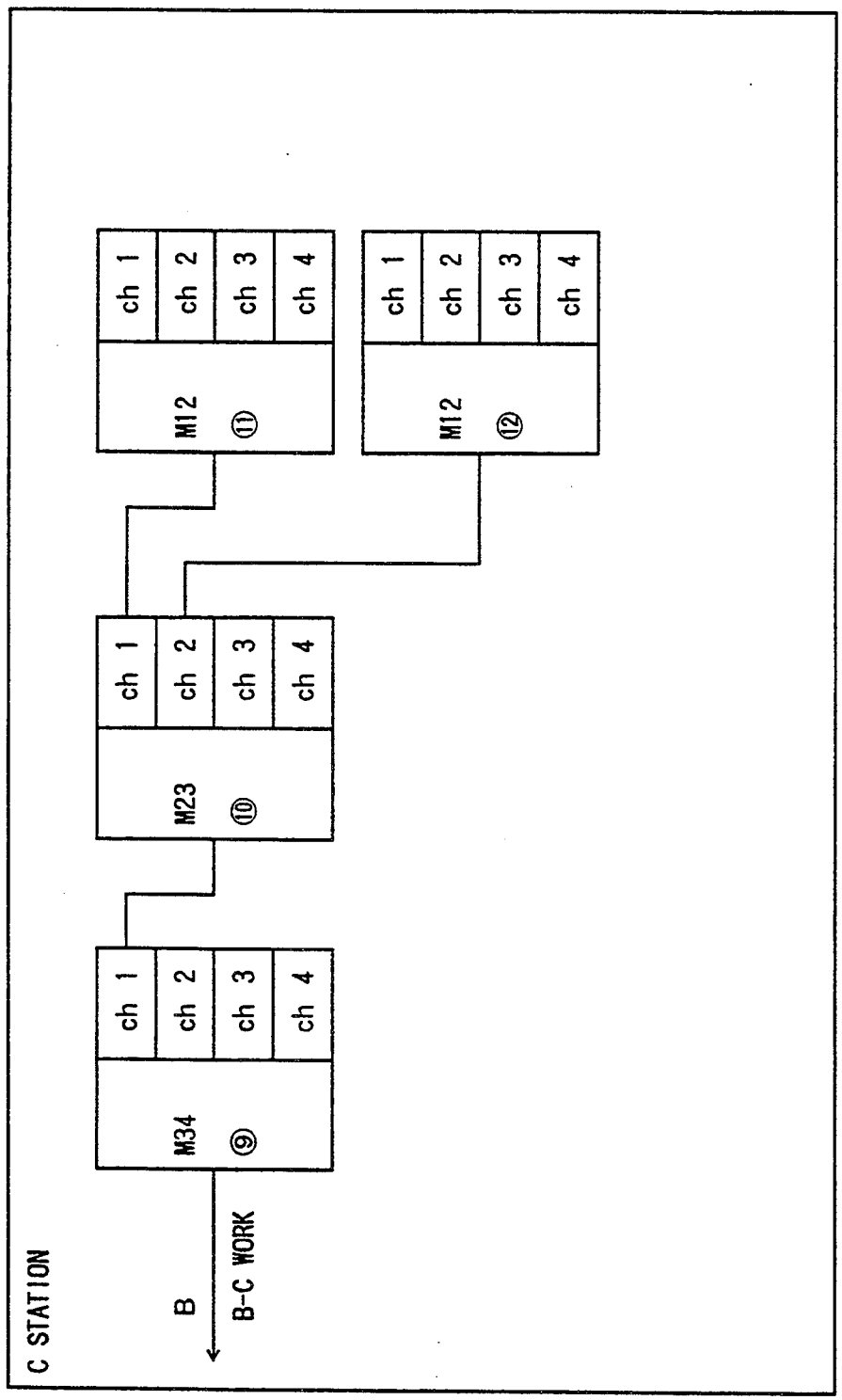
FIG. 33 is a diagram illustrating the MUX map in the station C.

When the route map process S100 is activated, a transmission route from the station B to the station C connected to the station B by the fourth-order optical line is displayed by the display unit 114 as shown in FIG. 32. The tracing process is then carried out in accordance with the flow chart shown in FIG. 22. When the route map process is completed, the MUX map process S200 for the station C is activated and a MUX map indicating the connection states of multiplexer in the station C is displayed by the display unit 114 as shown in FIG. 33. When the MUX map process S200 is activated, the tracing process is carried out in accordance with the flow chart shown in FIG. 23. In this tracing process, after the CPU 100 recognizes the multiplexer M12 (11) corresponding to the channel address 1-1-0 (steps S206 and S208), the order number in which the connecting state is checked reaches "2" set in the register (j). As a result, the tracing process is completed.

According to the above processes, the transmission route is traced from the multiplexer M12 (2) in the station B which multiplexer is identified by the user to the multiplexer M12 (11) in the station C which multiplexer is opposite to the multiplexer M12 (2). In this tracing process, the multiplexers and the light-to-electric converters LTE and the transmission route all of which are recognized by the CPU 100 are displayed on the display unit 114 so as to be distinguished from other devices. For example, when the multiplexer M12 (2) in the station A has a fault, a point at which the fault occurs is estimated with reference to the transmission route displayed on the display unit 114.

The present invention is not limited to the aforementioned embodiments, and variations and modifications may be made without departing from scope of the claimed invention.

What is claimed is:

1. A tracing system for tracing and displaying a transmission route between multiplexers in a transmission network in which a plurality of stations are connected by lines, each station accommodating one or a plurality of multiplexers, said tracing system comprising:
   a first database provided with information indicating states in which multiplexers in each station in said transmission network are connected to each other;

a second database provided with information indicating attributes of transmission routes between stations connected to each other by a line;

a third database provided with information indicating transmission routes accommodated in each of said stations;

input means for inputting information regarding a multiplexer positioned at a tracing start point of tracing;

route map processing means for tracing, based on the information provided in said second database, a transmission route from a starting station to a terminating station;

MUX map processing means for tracing, based on the information provided in said first data base, a connecting path in which multiplexers are connected in said terminating station of the transmission route traced by said route map processing means;

station map processing means for tracing a transmission route corresponding to a back-to-back connecting formation based on the information provided in said third database when the connecting path traced by said MUX map processing means includes the back-to-back connecting formation;

changing means for changing the information indicating the tracing start point based on a position of a multiplexer connected to an end of the transmission route which corresponds to the back-to-back connecting formation and is traced by said station map processing means;

tracing control means for switching between said route map processing means, said MUX map processing means, said station map processing means and said changing means so that the transmission route is traced from the multiplexer at the tracing start point identified by the information input by said input means to a multiplexer opposite to the multiplexer at the starting point; and display means for displaying the transmission route and the connecting path traced by said route map processing means, said MUX map processing means and said station map processing means all of which are switched by said tracing control means.

2. The system as claimed in claim 1, wherein said MUX map processing means has determination means for determining whether or not the connecting path traced by said MUX map processing means includes the back-to-back connecting formation, and wherein said station map processing means is activated in accordance with a determination result obtained by said determination means.

3. The system as claimed in claim 1, wherein said transmission network in which the transmission route is to be traced by said system is a transmission network of a CEPT type.

* * * * *